United States Patent
Holmes et al.

(10) Patent No.: US 6,334,056 B1
(45) Date of Patent: Dec. 25, 2001

(54) SECURE GATEWAY PROCESSING FOR HANDHELD DEVICE MARKUP LANGUAGE (HDML)

(75) Inventors: Wayne L. Holmes, Shoreline; David C. Olander, Edgewood, both of WA (US)

(73) Assignee: Qwest Communications Int'l, Inc., Denver, CO (US)

( * ) Notice: Subject to any disclaimer, the term of this patent is extended or adjusted under 35 U.S.C. 154(b) by 0 days.

(21) Appl. No.: 09/322,723

(22) Filed: May 28, 1999

(51) Int. Cl.⁷ ........................................ H04Q 7/20

(52) U.S. Cl. .................. 455/445; 455/424; 455/428; 370/351; 370/353

(58) Field of Search ................... 455/445, 410, 455/411, 412, 418, 419, 424, 425, 426, 428, 433, 422; 370/351, 352, 328, 353, 355

(56) References Cited

U.S. PATENT DOCUMENTS

| | | | |
|---|---|---|---|
| 5,895,471 | * | 4/1999 | King et al. ............................ 707/104 |
| 5,923,738 | * | 7/1999 | Cardillo, IV et al. ............. 379/93.25 |
| 5,923,885 | * | 7/1999 | Hohnson et al. .................... 395/712 |
| 6,061,346 | * | 5/2000 | Nordman .............................. 370/352 |
| 6,108,406 | * | 8/2000 | Mitchell et al. .................. 379/93.25 |
| 6,115,754 | * | 9/2000 | Landgren .............................. 709/249 |
| 6,119,155 | * | 9/2000 | Rossmann et al. .................. 709/219 |
| 6,119,167 | * | 9/2000 | Boyle et al. .......................... 709/234 |

OTHER PUBLICATIONS

Wireless Integration Xtra; Wireless Protocol Links Mobile Phone Users to Internet;author Michael Fahey; Feb. 23, 1999; http://www.broadband-guide.com/wi/news/newsnd9710.html.

Preface (Introduction, Handheld Devices, Physical Characteristics); Handheld Device Markup Language (HDML); Feb. 23, 1999; http://ms418qzh.ms.u-tokyo.ac.jp:1997/TR/hdml20-3.html#HEADING3-2.

Unwired Planet-HDML; Unwired Planet UP; Copyright 1997, 1998 Unwired planet, Inc.; http://www/uplanet.com/tech/products/hdml.html.

* cited by examiner

*Primary Examiner*—William Trost
*Assistant Examiner*—Conavan Tran
(74) *Attorney, Agent, or Firm*—Marsh Fischmann & Breyfogle, LLP

(57) ABSTRACT

Secure access is provided for a limited access data network (intranet) to handheld electronic devices which include the functionality to process alphanumeric information and process information received in handheld device markup language (HDML). A handheld device user may first establish a connection with a data network such as the World Wide Web. Through use of a uniform resource locator (URL) request made over this data network, a connection is made to an intranet. At the firewall for the intranet, an identification process is performed to determine that the URL request originated from a handheld device. Such a request is routed through a socket designated for such requests and received by a proxy server. The proxy server provides the necessary security steps in order to provide access to applications within the intranet, and once validation has been confirmed, connection to the application is established. The proxy server further includes the functionality to convert information received from the applications into HDML, so that it may be processed by the handheld device.

20 Claims, 4 Drawing Sheets

SECURE GATEWAY PROCESSING FOR HANDHELD DEVICE MARKUP LANGUAGE (HDML)

FIELD OF THE INVENTION

This invention relates to a method and apparatus for processing communications signals from wireless handheld devices, and more particularly to providing a method and apparatus for processing communications signals between wireless handheld devices and a data network.

BACKGROUND OF THE INVENTION

Use of cellular and other wireless types of communication devices have become more commonplace. Entire networks have been established for processing communications signals transmitted and received by cellular phones. Initially, the only types of information processed by the network were audio information and limited amounts of alphanumeric information relating to the processing of telephone numbers.

As digital technology has advanced, the amount of information which may be transmitted and received by wireless telephones has increased. For example, wireless telephones are now able to process and display alphanumeric information. This information is presented through a small screen incorporated into the telephone.

One feature which has recently been incorporated into some cellular or wireless telephones is the functionality to process information received and transmitted over a data network such as the World Wide Web. The main limitation of these small handheld devices is that only a few lines of alphanumeric information may be displayed at one time, there is a limited key pad for entering information, and most handheld devices do not have the types of memory resources which allow for processing of information received from servers connected to a data network such as the World Wide Web.

In order to accommodate the use of handheld devices for accessing information over a data network, a processing language called Handheld Device Markup Language ("HDML") has been developed. This language is especially suited for formatting Web content for the bandwidth or display size constraints of a handheld device. Whereas the fundamental structural unit of HTML is a page, in HDML, the fundamental unit is a deck of cards. Each HTTP response from a web server is packaged in the form of an HDML deck. A deck may contain one or more cards, each which specifies a single interaction between the device and the user. Some examples of the types of information provided include displays of information, display of a prompt which lets a user enter a string of inputs, displays a list of options for user to select, and the performance of various hidden operations.

SUMMARY OF THE INVENTION

The inventors have recognized that the use of handheld devices which include the functionality to receive and transmit information over a data network, may be a tool employed by businesses to provide various information to remotely located employees, such as field service agents. For example, a service agent may be able to, via the handheld device, access certain company records on the company's limited access network. However, as is well known in networking technology, in order to provide security for a limited access data network (intranet), certain safeguards may be implemented to limit access.

Described herein is a method and apparatus for providing access to an intranet through use of a handheld device. The method and apparatus described herein provide this service while conserving processing resources and providing the necessary security in order to protect the integrity of the data network. The system described herein may include a wireless communication device which processes and displays information which has been converted to the handheld device markup language (HDML). The wireless communications device may establish a connection with a communications network, such as a cellular or PCS network. Through the wireless service provider's network a connection may be established with a public data network, such as the World Wide Web. Finally, in connection with the public data network may be an intranet to which the wireless device is establishing a line of communication.

The intranet may include an interface device which acts as a gateway for communications. Access to the intranet is controlled according to a predetermined criteria. The data gateway may recognize a request from the wireless communications device and routes all communications from these devices through one socket in the gateway to a predetermined interface device, such as an application server. From this interface device, queries may be sent out to the wireless device to enter the appropriate security information for allowing access to the intranet. Once the appropriate information has been entered, and the wireless communication user has been designated as authorized, the interface device directs the requests from the wireless device user to the appropriate applications within the intranet.

In one aspect of the invention, the wireless communication device may be a cellular or digital personal communications service (PCS) telephone which receives and transmits information to and from a cellular tower which is part of a cellular network. The cellular tower may be connected to a data communications device which transmits the information either over a public data network such as the World Wide Web, or via a private circuit such as a frame relay type network.

Trough the public data network, a connection may be established with the intranet. In another aspect of the invention, access to the intranet may be controlled through the use of a firewall type device located in a router which controls access to the intranet. Programmed into the firewall, may be the functionality to recognize uniform resource locator (URL) requests received from a handheld device. All such requests may be routed through a single socket through the firewall to a proxy server which performs the necessary security verifications in order to provide access to the intranet.

The proxy server may request from the handheld device user, a user ID as well as a password. If the handheld device user is not able to provide both pieces of information, access to the data network is denied. If the necessary information is provided, access may then be granted and the URL request received may be processed. The proxy server then routes the user to the appropriate application within the Internet.

DETAILED DESCRIPTION

Figure 1:
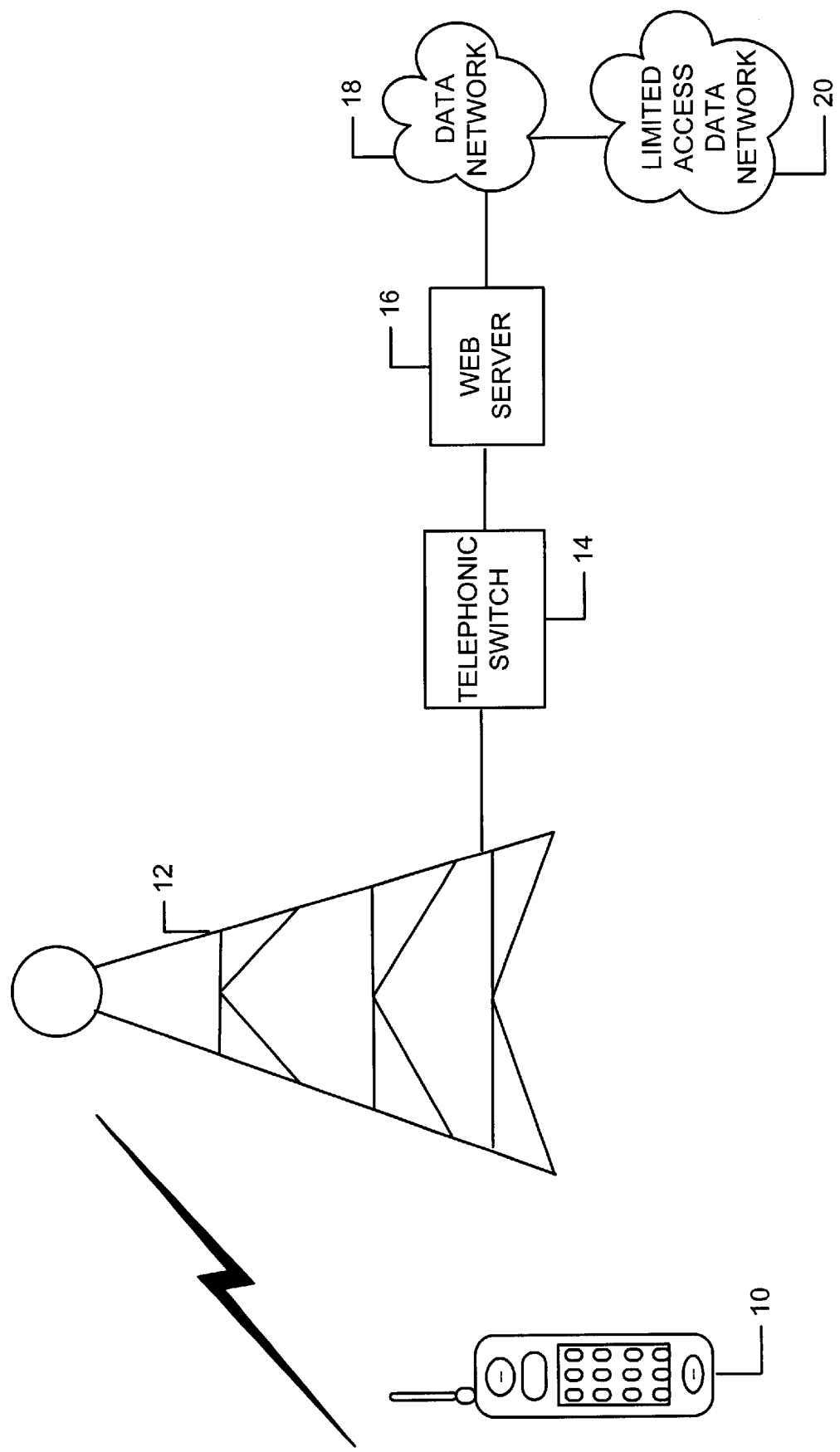
FIG. 1 discloses the network which facilitates communications between the handheld device and an intranet.

Disclosed in FIG. 1 is an overall system which includes the components employed to provide communications between a handheld device 10 and a limited access Internet 20. The wireless device 10 may be a cellular or personal communications service (PCS) telephone which includes the functionality to receive and transmit alphanumeric information in addition to audio information. Through use of radio transmissions, the wireless device 10 establishes communications with a remote location via the cellular network. The cellular network includes a cellular tower 12 which receives the radio transmissions from the wireless devices and converts these communication signals to electrical signals. These electrical signals are transmitted to telephonic switch 14.

The telephonic switch 14 may direct communications signals to a specialized data communications device 16 which acts as an interface to a data network such as the World Wide Web. In one embodiment of the invention the specialized data communications device 16 is a server upon which Uplink software from Phone.com, Inc., of Redwood City, Calif. is installed. Based on information included in the signals received from the wireless device, the data communications device establishes the connections with the appropriate node in the data network, such that signals may be received or transmitted to a designated intranet.

In another aspect of the invention, instead of employing a public data network such as the World Wide Web, a private frame relay network may be employed to establish communications with between the wireless service provider's network and the intranet. This frame relay network provides the necessary security so that communications do not have to be encrypted or de-encrypted.

Connected to the data network 18 is the intranet 20. This data network may be a local area network for a particular organization which limits access to its contents to users who have the necessary privileges or authorizations in order in order to establish a connection. The composition and security measures of the limited access Internet will be described in greater detail below.

Currently, wireless technology has advanced to the point that wireless telephones now include the ability to process both audio and alphanumeric information. In fact, it is known that some wireless phones include the functionality to act as pagers and display alphanumeric messages which may be associated with a page or email. The next step in this communications technology, is providing the functionality for these types of devices to access data networks such as the World Wide Web, or a private data network, i.e., intranet, and access information which may be contained therein.

Figure 2:
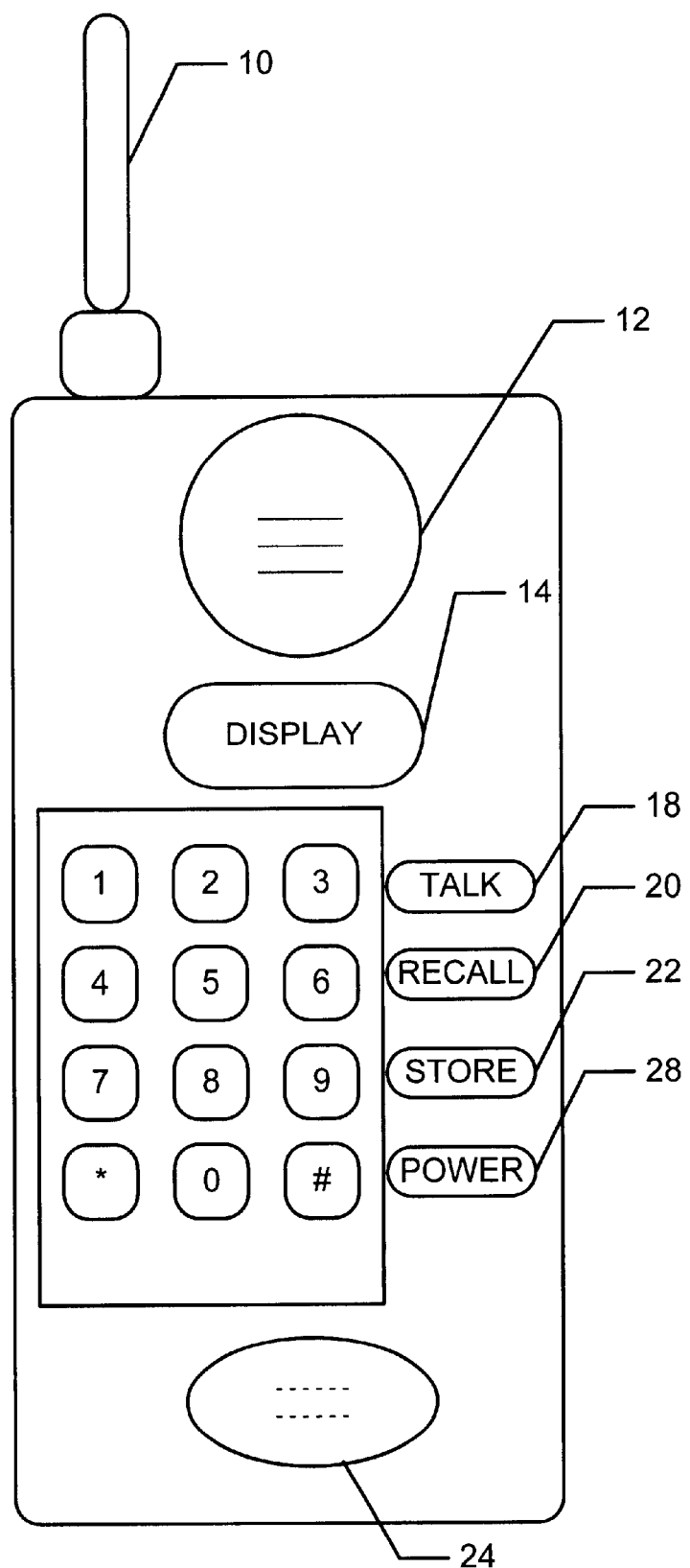
FIG. 2 discloses a front view of a cellular telephone which includes the display.

Disclosed in FIG. 2 is a front view of a handheld wireless device which provides the functionality to establish a connection with an intranet. Once a connection has been established via the cellular telephone communications network, alphanumeric information which is either received or transmitted may be displayed on alphanumeric display 24. In most situations, this small liquid crystal screen provides for the display of a limited number of lines of information. Entry or manipulation of this information may be performed through the use of the keypad 24 or the other function buttons 26–28. In order to accommodate the use of handheld devices for accessing information over a data network, a processing language called Handheld Device Markup Language (HDML) is employed. This language is especially suited for formatting web content for the bandwidth or display size constraints of a handheld device. HDML processes information such that it may appear as consecutive screens or be condensed such that it is viewable with a limited number of lines of alphanumeric information.

Figure 3:
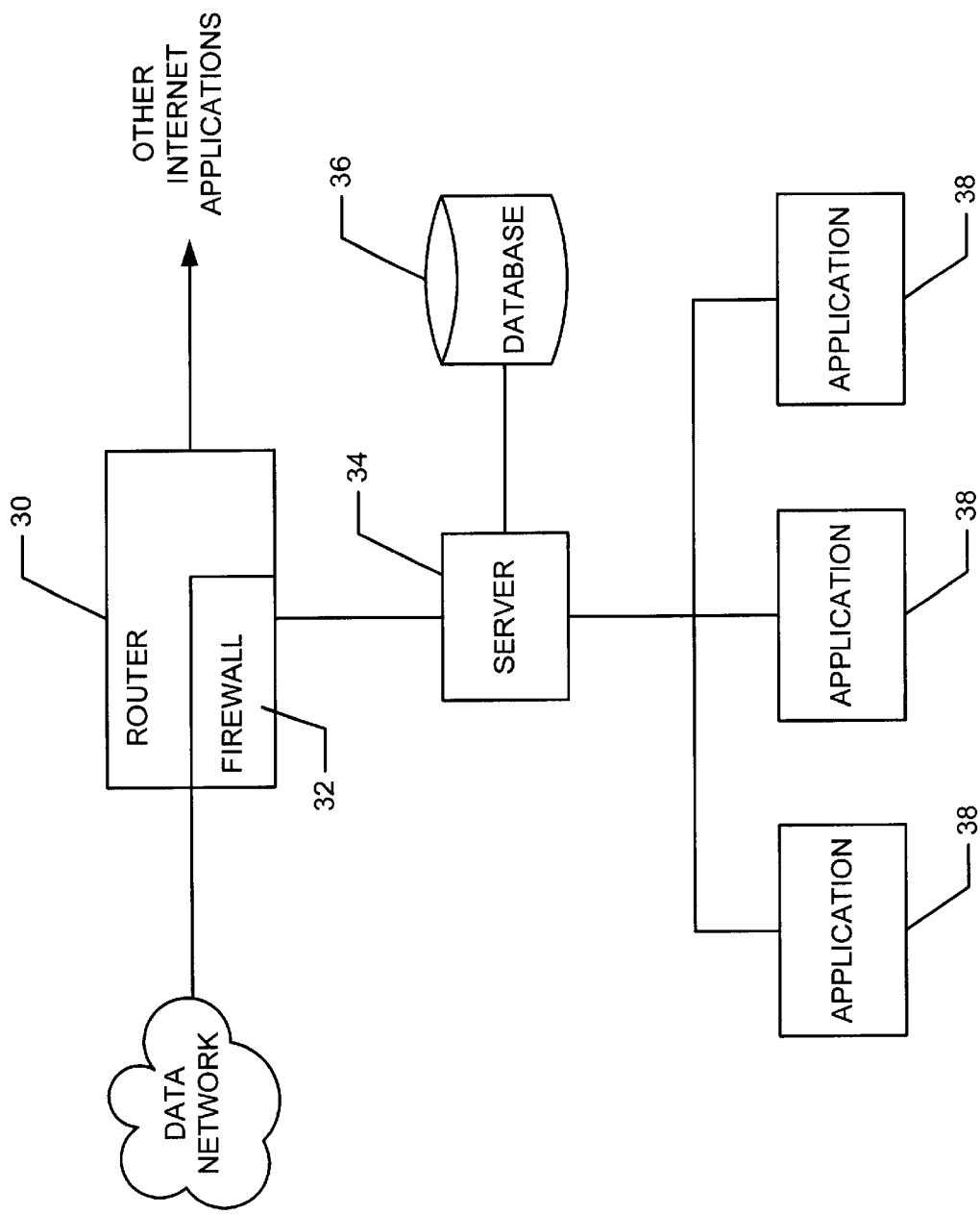
FIG. 3 discloses an internal system diagram for a portion of the intranet.

Disclosed in FIG. 3 is a system diagram for intranet 20. The interface between the data network and the Internet is provided by router 30. This router provides all the necessary processing for the receipt and transmission of information to and from the intranet. Incorporated into the router is firewall 32. The firewall is a system or group of systems that enforces a security policy between the Internet and the intranet. This firewall determines which inside services may be accessed from the outside, which outsiders are permitted access to particular inside services and which outside services may be accessed by insiders. All traffic to and from the intranet passes through this firewall where it is inspected. This firewall also includes the functionality to identify particular types of traffic and based on this identification route traffic to the appropriate socket through the firewall.

In the system diagram shown in FIG. 3, the firewall is connected to proxy server 34. This firewall may also provide a connection to all other applications within the intranet. In the embodiment shown in FIG. 3, the server 34 acts as a proxy for all communications received from and transmitted to the handheld devices. This server performs a number of functions relative to these communication signals. A first function is providing security for the applications 38 to deny access to system users who are not either authorized to access the applications as a whole or are limited in the applications with which a connection may be established.

Before a user of a handheld communications device may access any of the applications in the intranet a user name and password must be entered. One skilled in the art would know that additional information may be required to be entered to provide the necessary level of security. The security information needed to perform this analysis may be retrieved from database 36. This database contains information relative to the users of the intranet.

Once access is provided to the intranet, based on the URL received from the handheld device, the server will route the user to the appropriate application 38. In a system in which field agents employ the handheld devices and wish to access applications within the intranet, these applications may comprise a number of different data sources. For example, one application may be technical tools which the field agent requires in order to perform the necessary task. Further, databases may be accessed which provide information regarding customers, procedures, or other relevant information (telephone numbers, part numbers, etc.). Still further, company news or other bulletins regarding the service provided by the field agent may also be accessed. This system provides the functionality such that the latest information may be accessed by field agents without expensive bulky equipment, or significant human interaction back at the business location. In operation, a field agent who is using a cellular telephone with the necessary display functionality, would first establish a telephonic connection using the cellular network. Once the connection is established, the handheld device user may enter the necessary information through the keypad to signal the cellular communications switch that a connection over the data network is desired. The signal from the handheld device is routed to the data communications device which establishes a connection with a public data network such as the World Wide Web. Included with the initial access information is a URL of an application within the intranet. The URL will be processed such that, via the data network, a connection is established with the router 20 of the intranet. As was discussed above, a private circuit such as a frame relay circuit may be established between the wireless service provider and the router of the intranet.

Once a connection is established with a router, the router, and more specifically the firewall, will identify the incoming URL as being transmitted by a handheld device. Upon identification, the signal is routed to a socket through the firewall designated for this type of communication. According to the present invention, the only security function performed at the firewall is to validate the traffic comes from a known wireless service provider. The designated socket routes all signals from handheld devices to proxy server 34. At this server, a number of security functions are performed for providing access to applications within the intranet.

A first security function performed by the server 34 is to request a user ID for the handheld device user. Once this is received, a search is made of database 36 to confirm that the ID entered by the system user is in the list of valid users. In order to confirm that, the user is who he says he is, a password is requested and if the password does not match that stored in database 36, access is denied. Once access is granted, the server 34 locates the application associated with the URL and accesses the requested information. Information collected from these applications must be converted to HDML so as to be readable by the handheld device. This function is performed by server 34. The information is then transmitted in this format to the appropriate handheld device.

Figure 4:
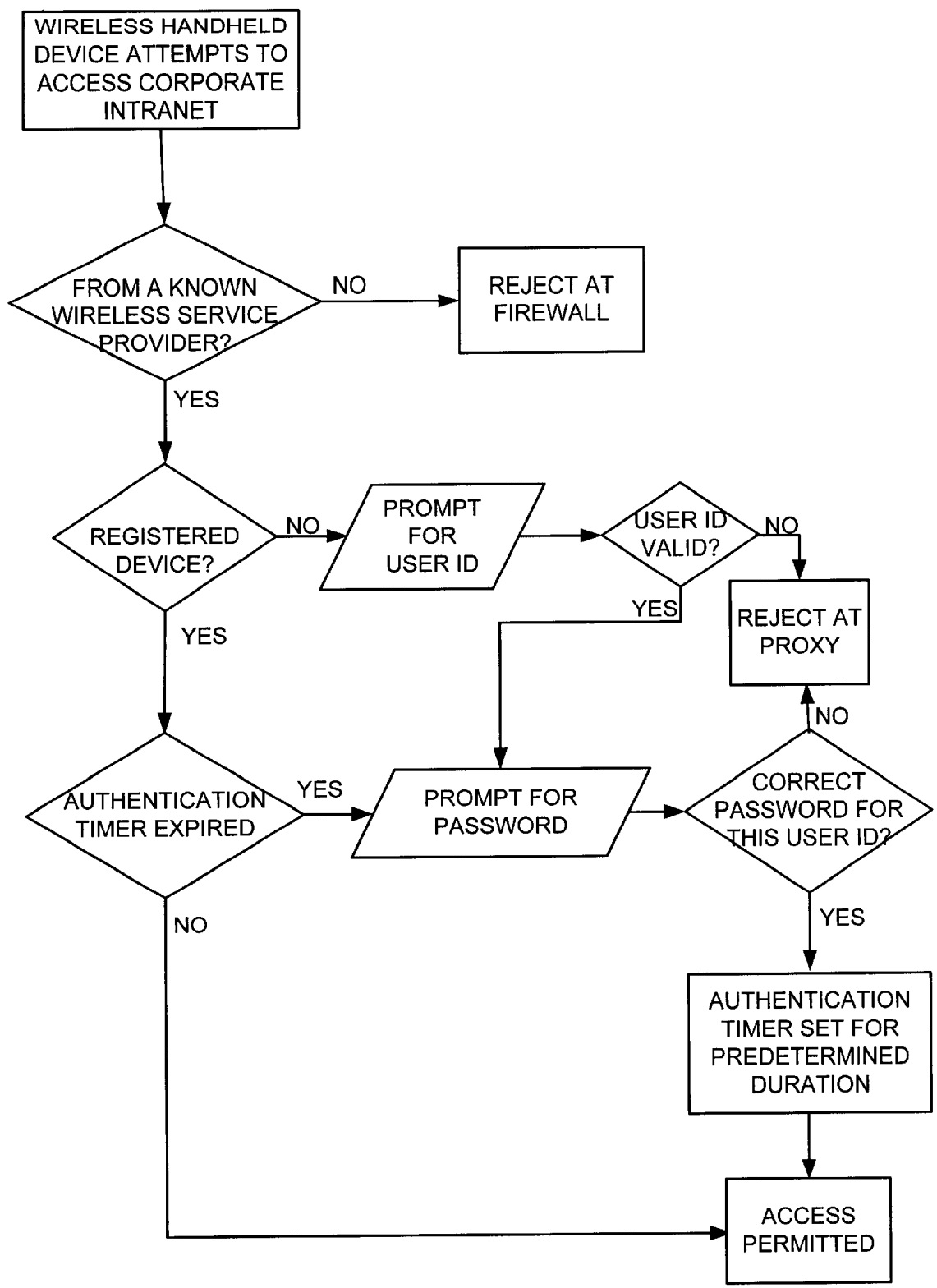
FIG. 4 discloses a flow chart which describes the operation for processing information received and transmitted to the handheld device.

Disclosed in FIG. 4 is a detailed description of the steps performed by the proxy server 34 when providing access to the intranet. The first step performed at the firewall is to ensure that the incoming URL request originated at a wireless service provider that is known to host wireless devices that have been authorized to access the intranet. If not, the request is rejected at the firewall. If the request is from an authorized provider, the URL request is passed to the proxy server to determine if the actual device has been registered to access the intranet. If the device is unregistered the proxy server transmits a request to the handheld device which requires the user to provide a unique, valid userid and password combination. Once the user supplies a valid userid and password combination the device's status changes to "registered", the authentication timer is set for a predetermined length of time, and the user is permitted access to appropriate information on the intranet. If the device is already registered, then the only checking done by the proxy server is the authentication timer. If this timer has expired, the user is prompted to enter only their password, which is checked to ensure a valid userid, and password combination has been presented. If the device is registered and the authentication timer has not expired, the user will have access to the intranet until the timer expires, the user performs a logout function or the registration status of the device changes.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A wireless communication system comprising:
   a first data network in connection with a wireless transceiver device which receives wireless communication signals from at least one handheld wireless communications device, where the at least one handheld wireless communication device includes functionality to receive, display, and transmit alphanumeric information, said transceiver device converts, processes and transmits the communications signals received from both the wireless communications device and the first data network; and
   a second data network in connection with the first data network which receives and transmits the communications signals, the second network comprising:
      a router device configured to act as an interface with the first data network to receive and process signals from a plurality of data sources, wherein said router device is further configured to identify the communications signals received from the at least one wireless communications device and to direct the communications within the second data network based on the identification; and
      a proxy server configured receives the communications signals from the at least one wireless communication device and to perform particular security operations to determine the validity of the at least one wireless communications device, and if the validity of the at least one wireless communications device is established, providing access to applications in the second data network specially configured to communicate with the at least one handheld wireless communications device.

2. The system of claim 1 wherein the wireless device is a handheld telephone which provides for entry and display of alphanumeric information.

3. The system of claim 1 wherein the first data network is the Worldwide Web.

4. The system of claim 1 wherein the first data network is a private fast packet network.

5. The system of claim 1 wherein the communication signals are encoded in handheld markup language (HDML).

6. The system of claim 1 wherein the router device includes the functionality to identify types of traffic received and route the traffic to an appropriate socket.

7. The system of claim 1 wherein the transceiver device is a server programmable to establish a connection with the first network based on the communications signals received from the at least one wireless communicating device.

8. A network interface system, comprising:
   a router device in connection with a first data network which provides for the receipt and transmission of traffic over the first data network, wherein the router device is configured to identify communications signals within the traffic which originate from at least one handheld wireless communication device and to direct the communications signals to a particular socket based on the identification; and
   a proxy server device connectable to the router device which may receive the communications signals directed through the particular socket and perform an analysis to determine the authenticity of the at least one handheld wireless communications device from which the communications signals originate, which includes transmitting at least one request to the at least one handheld wireless communications device to enter information relating to the authenticity of at least one handheld wireless communications device, and once authenticity is determined, establishing a line of communication between the at least one handheld wireless communications device and selected applications which are specially configured to communicate with the at least one handheld wireless communications device.

9. The system of claim 8 wherein the router device and the proxy server device are incorporated includable in an intranet.

10. The system of claim 8 wherein the source is a wireless communications devices.

11. The system of claim 10 wherein the wireless communications device is a wireless telephone which provides for entry and display of alphanumeric information.

12. The system of claim 8 wherein the public data network is the worldwide web.

13. The system of claim 8 wherein the public data network is a private fast packet data network.

14. The system of claim 8 wherein the proxy server is adaptable to convert traffic to and from handheld device markup language (HDML).

15. The system of claim 8 wherein the traffic includes uniform resource locator (URL) requests.

16. A method of providing access for a wireless communications device to an intranet comprising the steps of:

provifing a network interface configured to identify communications signals received from at least one handheld wireless communications device over a public data network;

distinguishing the communications signals received from the at least one handheld wireless communications device from all other communications signals;

transmitting data signals to the at least one handheld wireless communications device requesting validation and verification information;

upon receiving the validation and verification information processing said validation and verification information to determine whether access will be granted to the limited access network; and if access is granted, directing the wireless communications device user to at least one application specially configured to communicate with the at least one handheld wireless communications device within the intranet.

17. The method of claim 16 further comprising the step of converting the data signals generated by the applications to HDML for transmission to the wireless communication device.

18. The method of claim 16 wherein the wireless communications device is a wireless telephone or other electronic device.

19. The method of claim 16 wherein the communication signals include a URL.

20. The method of claim 16 wherein the step of validation and verification includes at least one of: requesting a user identification from the operator of the wireless communications device and requesting a password.

\* \* \* \* \*